United States Patent [19]
Barnette et al.

[11] 4,418,405
[45] Nov. 29, 1983

[54] LENS POSITIONING CONTROLLER FOR OPTICAL PLAYBACK APPARATUS

[75] Inventors: William E. Barnette, Levittown, Pa.; Robert W. Jebens, Skillman, N.J.

[73] Assignee: RCA Corporation, New York, N.Y.

[21] Appl. No.: 278,452

[22] Filed: Jun. 29, 1981

[51] Int. Cl.³ .............................................. G11B 7/12
[52] U.S. Cl. ..................................................... 369/45
[58] Field of Search .................................. 369/44-46, 369/13, 18; 358/342

[56] References Cited
U.S. PATENT DOCUMENTS

| | | |
|---|---|---|
| 3,842,194 | 10/1974 | Clemens . |
| 4,044,379 | 8/1977 | Halter . |
| 4,354,103 | 10/1982 | Immink et al. ........................ 369/45 |
| 4,357,696 | 11/1982 | Bierhoff et al. ....................... 369/45 |

*Primary Examiner*—Raymond F. Cardillo, Jr.
*Attorney, Agent, or Firm*—Joseph S. Tripoli; Christopher L. Maginniss

[57] ABSTRACT

A focus servo system for optical disc record/playback apparatus includes three current drivers for maintaining the distance between an objective lens and an information surface of the disc substantially constant. One driver is a DC to low frequency amplifier which can drive the transducer over its full range to the mechanical stops. The second current driver is a DC to high frequency amplifier whose output at DC is limited to drive the transducer approximately twice the expected disc runout. At higher frequencies, the output is such that the displacement of the transducer does not exceed the displacement corresponding to DC value. In operation, the low frequency driver adjusts the DC operating point of the high frequency driver so that its output averages to approximately zero, thus decreasing the drive requirements of the high frequency driver. The third driver is a DC current source which sets the static operating point of the transducer.

15 Claims, 6 Drawing Figures

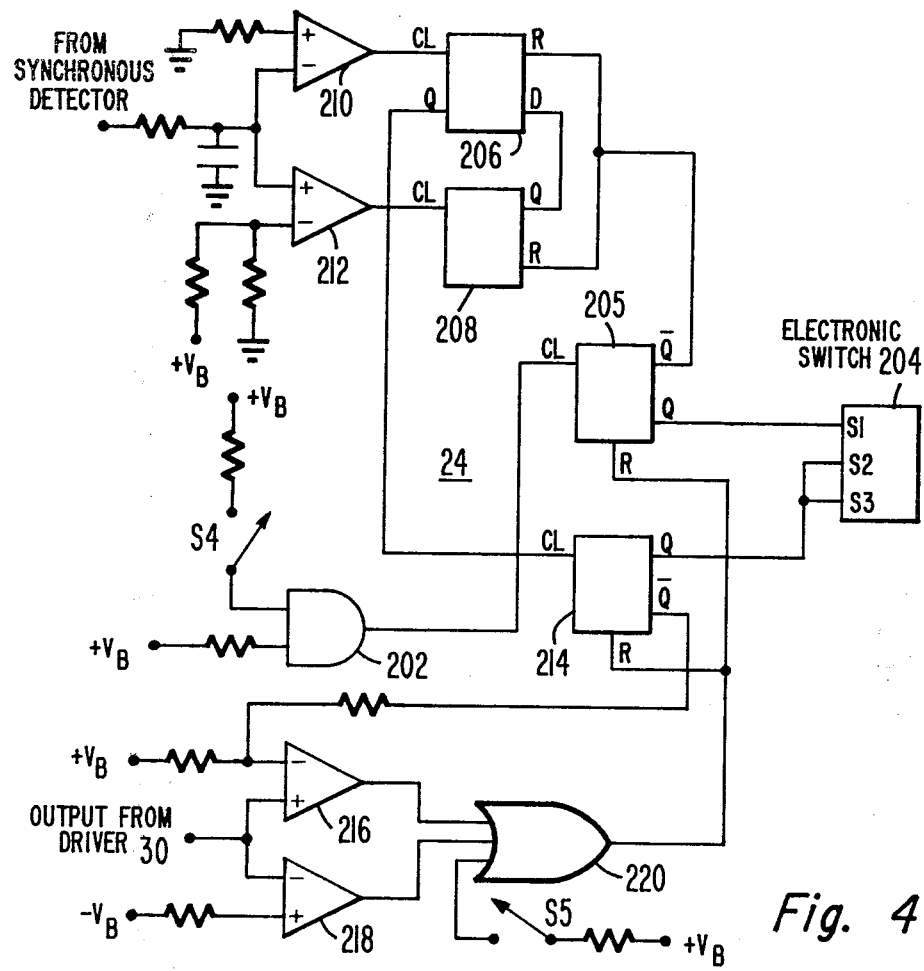
Fig. 4
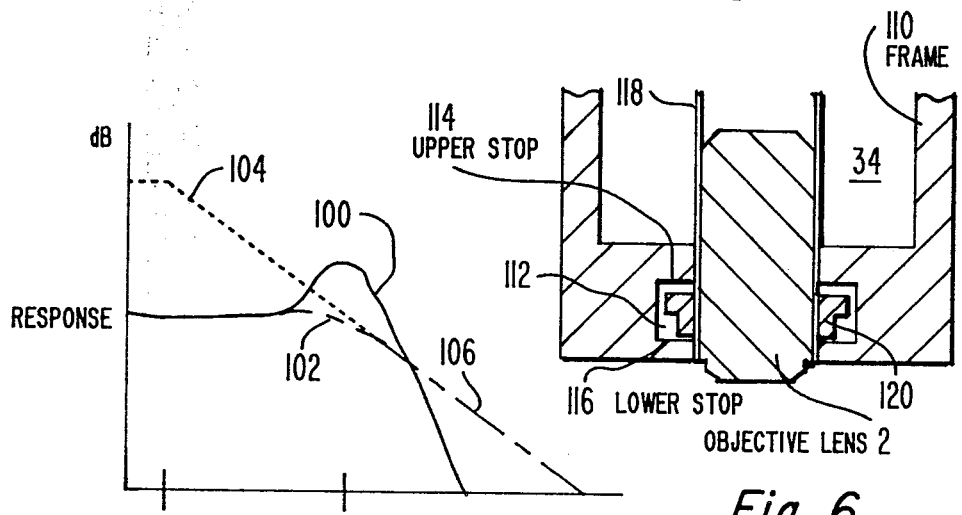
Fig. 5
Fig. 6

LENS POSITIONING CONTROLLER FOR OPTICAL PLAYBACK APPARATUS

This invention relates to an apparatus for reading or recording information, for example, video and/or audio information, on a flat record medium and, more particularly, to a focus system, for use in such an apparatus, for positioning an objective lens to maintain a light beam accurately focused on a moving surface of the record medium.

In an optical video disc player, a disc record is rotated on a turntable while a light beam scans a surface of the record having information recorded thereon. An objective lens focuses the light beam on the information bearing surface. Light modulated by the information recorded on the disc surface is reflected back through the objective lens and directed onto a photodetector that provides a signal output representative of the information recorded, for example, video information. In order to read out the information recorded at high densities on the disc surface, (or record information in the case of an optical video disc recorder) the light beam must be focused on the disc record surface so that the light spot covers only a very small area. In the most advantageous arrangement, the size of the light spot is diffraction limited. One problem associated with video disc players is that the surface of the disc record may not be perfectly flat with respect to a fixed point as the disc rotates—if the record disc is rotated on a turntable, eccentricities associated with disc, the turntable or the rotating drive mechanism may displace the surface of the disc. In general, the focusing lens is provided to maintain the light beam focused on the information surface to form a beam having the desired spot size. Eccentricities in the disc, turntable, etc., however, cause the distance between the focusing lens and surface of the disc to vary, thereby defocusing the impinging light beam. Variations in spacing between the focusing lens and the information surface may be compensated for by moving the focusing lens toward and away from the disc surface. To provide this compensation, the objective is usually suspended in springs and coupled to a drive coil in a radial magnetic field. The drive coil, or the objective, moves toward and away from the record disc surface in response to a control signal representative of the variations in spacing. The control signal is supplied by an electronic circuit which senses the variations in spacing.

In general, the present invention provides a new and improved apparatus for maintaining constant the distance between an objective lens and an information surface, while minimizing the danger of making inadvertent contact between them. In operation, focusing detectors are used to detect variations in the spacing between the lens and the information surface. An error signal representative of the spacing variations is fed via a servo loop to a drive system for moving the drive coil toward and away from the record disc surface. Under closed loop conditions, wide bandwidth servos which are capable of compensating for spacing variations are unpredictable if the closed loop condition is momentarily interrupted. If the open loop sensor characteristic has a narrow lock-in range, a momentary interruption of the closed loop error signal may cause the sensor to see the wrong polarity error signal. An incorrect polarity error signal could cause the drive coil to slam the objective lens against the surface of the disc being tracked, irreparably damaging the disc and objective lens system.

In accordance with the principles of the present invention, mechanical and electrical limits in the focus control system are provided to limit the range of up and down movement of the objective lens to reduce or eliminate the chance of making inadvertent contact between the objective lens and the information surface. Simultaneously, the focus control system of the present invention accurately maintains the objective in a focus position.

In accordance with one aspect of the present invention, an apparatus is provided in a focus control system for maintaining constant the distance between a surface of a record medium and an objective lens when relative motion is established between the surface and the objective lens. The apparatus includes a means for generating an error signal that varies in accordance with variations from a given value in the distance between the objective lens and the surface. Further, the apparatus includes means for moving the objective lens along an axis of the objective lens which is normal to the surface of the record medium. Coupled to the moving means are three control signal providing means. One means provides a DC control signal which effects a static positioning of the objective lens. The other two control signal providing means supply dynamic control signals for maintaining constant the spacing between the objective lens and the information surface. The first means for providing a first dynamic control signal of a given bandwidth effects a displacement of the objective lens such that the given value in the distance between the objective lens and the surface is maintained substantially constant. The second means for providing a dynamic control signal effects a displacement of the objective lens such that displacements of the objective which maintain the given value in the distance between the objective lens and the surface as effected by the first dynamic control signal average to approximately zero. The given bandwidth of the first dynamic control signal providing means is greater than the given bandwidth of the second dynamic control signal providing means.

Further, in accordance with another aspect of the present invention, the apparatus is provided with mechanical stops. A first mechanical stop limits the displacement of the objective lens in a first direction along the axis of the objective lens. A second mechanical stop limits the displacement of the objective lens in a direction opposite to the first direction such that the objective lens is spaced from the surface of the record medium during the relative motion.

In accordance with yet another aspect of the present invention, an apparatus is provided in a focus control system for maintaining an objective lens positioned to focus a light beam to a diffraction limited spot on a surface of a record disc when relative motion is established between the surface and the objective lens. The apparatus comprises means for generating an error signal that varies in accordance with variations from the focus position of the objective lens. Means are provided for moving the objective lens along an axis of the objective which is normal to the surface of the disc. The error signal is amplified by amplifying means having a variable gain over a given frequency band. Low frequency signals within the given frequency band are amplified more than high frequency signals within the given frequency band. A first resistive element which is connected to the moving means effects a critical damping of the moving means. Further, the apparatus comprises three current sources. A DC current source is connected in parallel arrangement with the first resistive element. This DC current source energizes the moving means to lift the objective lens to a nominal focus position. A first wide bandwidth current source provides a drive signal to the moving means to effect displacement of the objective lens to maintain the objective in the focus position during relative motion. The wide bandwidth current source which is connected in parallel arrangement with the first resistive element is current limited by a second resistive element. A first reactive element in combination with the first resistive element, connected between the first wide bandwidth current source and the moving means, provides a lead network for partially compensating for the frequency roll-off of the moving means. The other current source is a narrow bandwidth current source which effects displacement of the objective in a manner such that displacements of the objective effected by the first current source, which maintains the objective lens in the focus position, averages to approximately zero.

Other features and advantages of the invention will be more fully understood from the following detailed description of the preferred embodiment, the appended claims and the accompanying drawings in which:

FIG. 4 shows in greater detail the focus control logic circuit of FIG. 1;

FIG. 5 shows graphically the frequency response characteristics of the transducer of FIG. 1; and FIG. 6 shows an enlarged view of the details of the mechanical stop used for limiting the displacement of the objective lens of FIG. 1.

Figure 1:
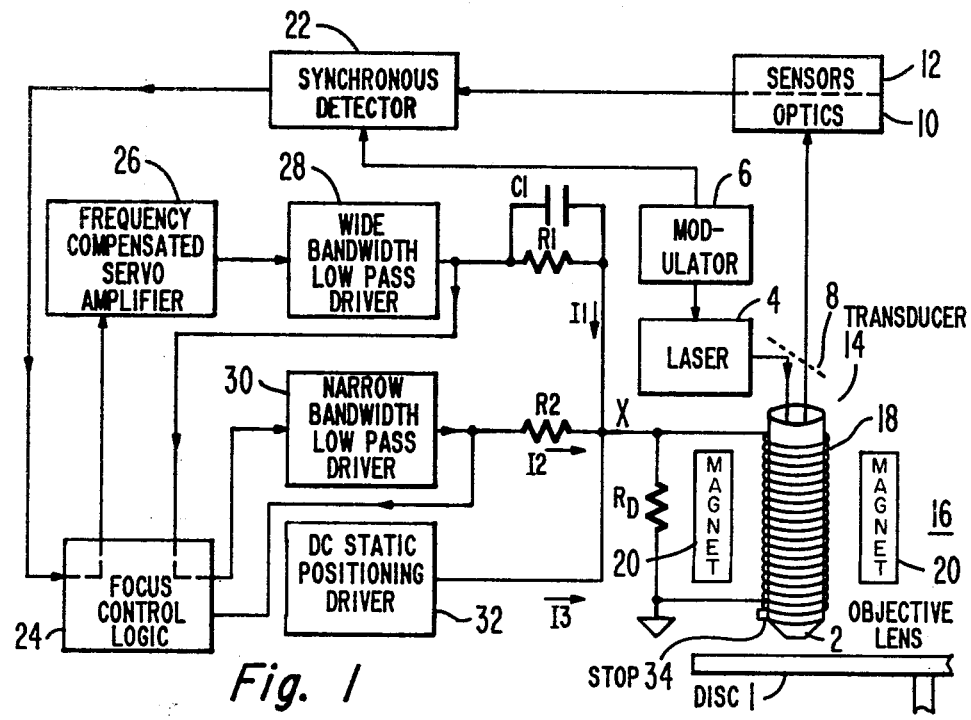
FIG. 1 is a diagrammatic representation, partially in block form, of an optical focus control system in accordance with the principles of the present invention.

Referring to FIG. 1, a diagrammatic view of a focus control system of an optical video disc player is shown. A focus control light beam is directed onto a disc-shaped record medium 1. The information structure of record medium 1 is, for example, a phase structure and comprises a spiral track. Record medium 1 may be of a type described in U.S. Pat. No. 3,842,194 issued to J. K. Clemens. In certain high density information records, video information is recorded as relatively short (e.g., 0.6–1.6 micrometers) depth variations along the length of the information track. Illustratively, a method of recording a Clemens type record may be of a type shown in U.S. Pat. No. 4,044,379 issued to J. B. Halter. Pursuant to the Halter method, an electromechanically driven stylus (e.g., of diamond) responsive to a combined video and audio signal records relatively short geometric variations representative of the time variations of the signal on a reflective surface of a metal substrate. After the electromechanical recording operation, the recorded surface of the metal substrate has a relief pattern corresponding to that which is desired in a final plastic replica disc. The optional video disc player of which FIG. 1 is a part may provide a system for verifying the accuracy of the information cut on the metal substrate described in the Halter patent prior to further record processing steps.

In accordance with the invention, a first source of light radiation (not shown) is directed through objective lens 2 and focused thereby to a diffraction limited spot on an information track on the surface of record medium 1. The diffraction limited spot is modulated by the information on the record while relative motion is established between the readout light spot and the record (illustratively, the record is rotated on a turntable). The reflected light is directed back through objective lens 2 to an optical detector (not shown) which converts the modulated light beam to an electrical signal representative of the stored information. Illustratively, the read system of the optical player may be of a type described in U.S. Pat. Application Ser. No. 218,100 of R. W. Jebens, entitled "Optical Focus Sensor" filed Dec. 19, 1980.

Figure 2:
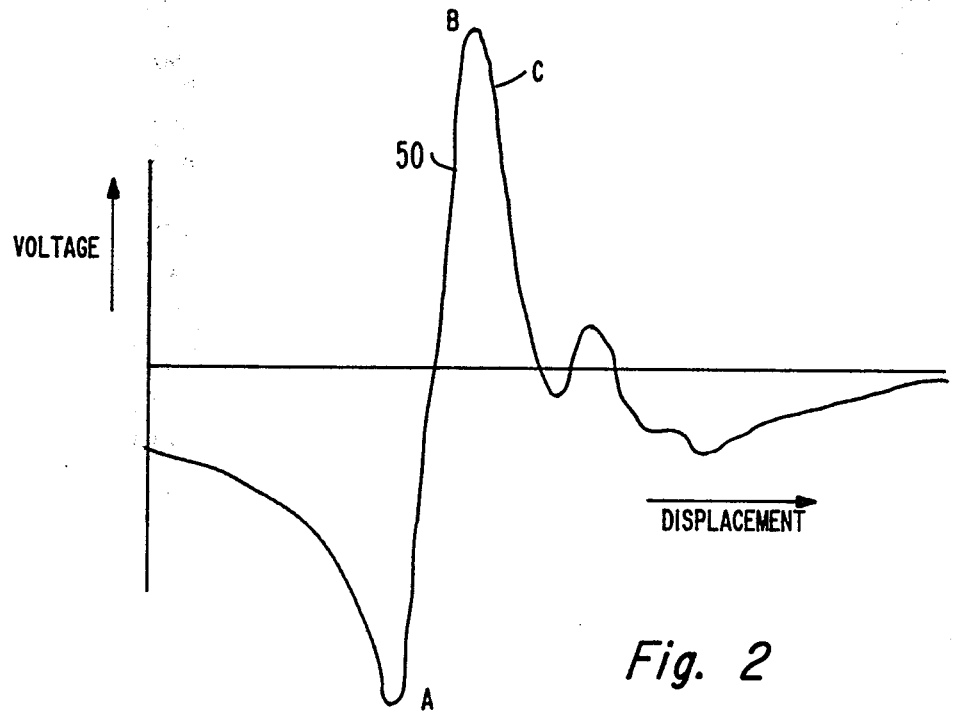
FIG. 2 is a graphical representation of the waveform of the error signal output of the synchronous detector of FIG. 1.

The apparatus according to FIG. 1 discloses a focus servo system for maintaining the readout light beam focused on the disc surface. A source of radiation 4 (illustratively, a semiconductor laser emitting a beam of coherent light of generally circular cross-section at a wavelength of approximately 820 nanometers) provides a light beam. The light beam from laser 4 is modulated by modulator 6. The function of modulator 6 will be explained in greater detail herein. The light beam from laser 4 is directed toward mirror 8 which reflects light in one direction and transmits light in another direction. On the first pass mirror 8 reflects the laser light beam. Lens 2 interposed between mirror 8 and record medium 1 receives the light beam emitted by radiation source 4 and converges it to form a light spot of generally circular contour having, in one illustrative embodiment, a diameter sufficiently large to span a plurality of convolutions of the spiral track formed on record medium 1 (i.e., lens 2 focuses the light beam to a point beyond the record medium surface). The reflected light is collected by objective lens 2, passes through mirror 8 and impinges on sensors 12 via optics 10. In accordance with one illustrative embodiment, sensors 12 may include a pair of split photodetectors. When objective lens 2 is positioned such that the light beam from the read laser is focused on record medium 1 to a diffraction limited spot, the light beam from laser 4 is incident on sensors 12 as a circle of confusion of a given diameter. As record medium 1 moves toward or away from objective 2 the circle of confusion varies in diameter in accordance with the variation in spacing between the surface and the lens 2. Sensors 12 provide an error signal (FIG. 2) indicative of the variation in spacing. Illustratively, the optics 10 and sensors 12 for providing an error signal may be of a type shown in the aforementioned Jebens application.

The objective lens is mounted in a transducer 14 having a drive mechanism 16 which consists of coil 18 and permanent magnets 20, illustratively, the drive mechanism may be a voice coil drive similar to one used in loudspeakers. During closed loop operation, the servo will attempt to maintain a lens position (corresponding to an in-focus condition) which produces a zero volt output between points A and B on the error signal characteristic curve 50 of FIG. 2.

The output from sensors 12 is synchronously detected by synchronous detector 22. As discussed supra the light beam is modulated by modulator 6. To eliminate effects of stray light and DC shifts, the detected light is synchronously detected with the same signal which is used to modulate the light beam. It should be noted, however, that the frequency of modulation (illustratively, 40 KHz) which is used for modulating and demodulating the focus light signal should be chosen such that any unwanted beat frequency signals produced by products of the modulating frequency and the recovered information signal are outside of the focus servo bandwidth.

The error signal from synchronous detector 22 is coupled through focus control logic 24 to frequency compensated servo amplifier 26. The error signal is then coupled via wide bandwidth low pass driver 28 and narrow bandwidth low pass driver 30 to transducer 14. The transducer is critically damped by resistor $R_D$, such that under open loop conditions, the transducer has a flat frequency response from DC to its resonant frequency and rolls-off at 12 dB/octave beyond its resonant frequency. Three current sources which are connected in parallel with each other drive the transducer.

These three drivers include wide bandwidth low pass driver 28, narrow bandwidth low pass driver 30, and DC static positioning driver 32, which provide three currents, I1, I2, and I3, respectively. Currents I1, I2, and I3 which are summed at node X drive transducer 14 to maintain the distance between objective lens 2 and the disc surface constant. During closed loop operations, drivers 28 and 30 operate in the servo loop while driver 32 operates open loop. The wide bandwidth driver 28 provides current I1 for driving the transducer to move lens 2 at a limited distance above and below a nominal focus position. Driver 28 is set to compensate for the vertical runout of the disc surface. For safety reasons, current I1 is limited such that the lens will not, under normal operating conditions, contact the mechanical stops.

In closed loop operation, narrow bandwidth driver 30 provides a low frequency current drive. Since driver 28 provides a current which will effect only small displacements of the transducer, thermal or DC drifts could affect the system such that the lens will not follow the undulations of disc during playback, for example, the disc surface may undulate within tolerance, however, current I1 cannot drive the transducer to compensate for the undulations because the disc has heated up and expanded in thickness so that it is outside of the range that current I1 can drive it. Therefore, driver 30 is arranged to compensate for the DC operating point of driver 28. Driver 30 is connected to the output of driver 28. Its function during closed loop operation is to drive the transducer such that the output signal from driver 28 averages near zero. Driver 30 provides substantially more gain at DC than driver 28 (e.g., 20 times) and yet rolls-off at higher frequencies so that driver 28 effectively compensates for the high frequency undulations of the disc surface.

The nominal focus operating position of objective lens 2 is set by DC static positioning current driver 32. Driver 32 provides sufficient current (I3) to coil 18 to overcome the weight of objective lens 2. Without driver 32, the weight of the lens would allow it to lie against mechanical stop 34. (The mechanical stop will be described in greater detail with reference to FIG. 6).

Figure 3:
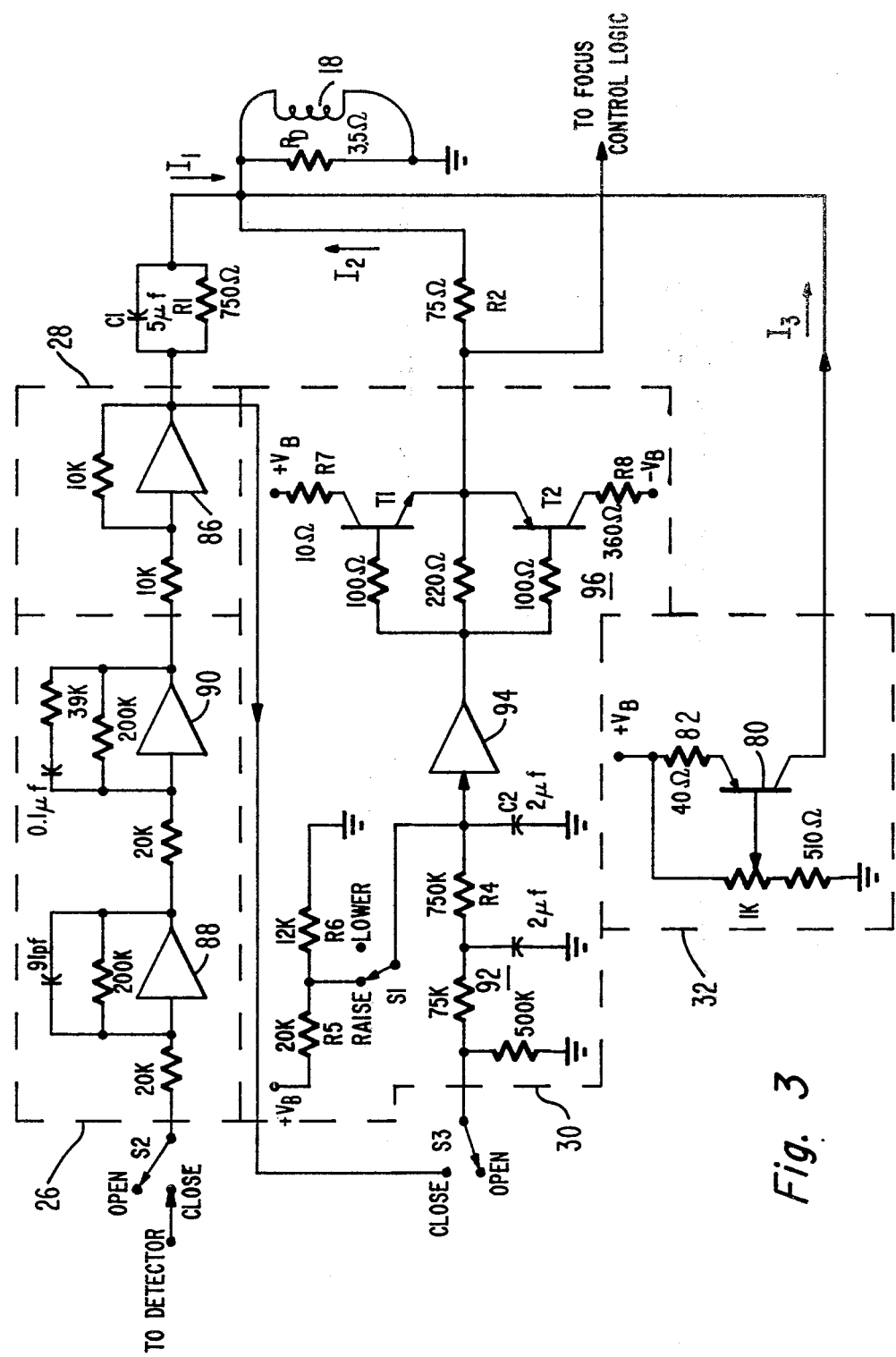
FIG. 3 shows in greater detail a portion of the focus control system of FIG. 1.

A preferred embodiment of the three current sources is shown in FIG. 3. Like components of the FIGURES are identified by the same reference numerals. DC current source 32 includes transistor 80 whose emitter electrode is connected via resistor 82 to voltage source $V_B$.

Driver 32 is designed to keep the lens from crashing against the disc. In the event of a power failure, current I3 would be removed permitting transducer 14 to fall, however, it would drop only as far as the lower mechanical stop. If, on the other hand, the driver should be short circuited to the single polarity power supply, the polarity is such that the lens will be lifted away from the disc until is contacts the upper mechanical stop. Resistor 82 limits passively the current lifting of the transducer such that if the driver is shorted the lens would not strike the upper mechanical stop with enough force to damage it.

The error signal from the synchronous detector which is a measure of the displacement of lens 2 from a focus position is delivered via switch S2 of focus control logic to operational amplifier 88 of frequency compensated servo amplifier 26. Op Amp 88 provides a signal gain (illustratively, the gain equals 10) and filters out the high frequency chopper signal of the synchronous detector. Operational amplifier 90 which is connected to Op Amp 88 provides gain at DC (illustratively, the DC gain is 10), rolls-off at 6 dB/octave from the once around rate of the turntable (illustratively, 7.5 Hz) to the resonant frequency of the transducer (illustratively, 40 Hz) and flattens out above the resonant frequency. The frequency compensated servo amplifier 26 thus modifies the loop gain to provide compensation at the lower frequencies where the runout in the record medium is anticipated to be the greatest.

The output from the frequency compensated servo amplifier 26 is applied to the input of wide bandwidth low pass driver 28. This driver which is preferably provided with unity gain comprises operational amplifier 86. Op Amp 86 is a power amplifier which delivers one of the three currents, i.e., current I1, which drive transducer 14.

Driver 28 is current limited by resistor R1 so that at DC the drive current I1 can move the lens a limited amount, illustratively, twice the expected vertical runout of disc 1 (e.g., ±1 mil). Capacitor C1 is connected in parallel with resistor R1. The combination of resistor R1 and capacitor C1 provides a lead network to partially correct for a nominal 12 dB/octave roll-off of transducer 14. Even though this circuit provides an increasing current drive characteristic with increasing frequency, the displacement of the objective lens 2 at any frequency does not exceed the displacement at DC. One of the advantages of the I1 current supply is its resistance to short circuit failures. Since the current limiting is controlled passively, short circuits in the drive amplifier cannot cause high currents in the transducer coil 18 which would drive the transducer against the mechanical limits.

Under open loop conditions, the narrow bandwidth low pass driver 30 is current limited by resistor R2 to permit the objective lens to be moved over its full range to the limits provided by the mechanical stop 34 of FIG. 1. On the other hand, under closed loop conditions, the servo loop is opened if driver 30 displaces the lens by too much, illustratively, by more than four times the expected disc runout (e.g., ±2 mils). The lens is lifted to a "lens up" position close to the upper mechanical stop by moving switch S1 from the "lower" to the "raise" position. In closed loop operation, driver 30 adjusts the DC operating point of driver 28 so that the output signal from driver 28 averages near zero. The input to driver 30 is connected to the output of driver 28. Since driver 30 has a wide displacement range, low pass filter 92 is provided to reduce its speed of response, i.e., its response is modified to prevent the transducer from slamming against the mechanical stops with too much acceleration. Operational amplifier 94 in combination with power driver 96 which consists of a complimentary symmetry emitter-follower provides the drive current I2 which flows through resistor R2. Emitter-follower 96 has an asymmetrical drive capability such that positive current is only limited by resistor R7 in the collector of transistor T1 whereas negative current is limited by resistor R8 in the collector of transistor T2. This asymmetry which provides an additional safeguard against the lens striking the record effects less motion in the direction which approaches the disc than motion away from the disc (illustratively, from a nominal focus position objective lens 2 can travel 3 mils toward the disc and 10 mils away from the disc).

Driver 30 sees the voltage output from Op Amp 86. Its function, under closed loop operation, is to move the lens such that the average output of driver 28 is zero volts. Driver 30 has more gain at DC than driver 28, thus it essentially provides the low frequency drive current.

Driver 30 provides two functions. As mentioned supra, it compensates for the DC operating point of driver 28. This means that the tolerances may be loosened for the nominal focus position and thermal drifts may be compensated for. The second function of driver 30 is the lens lower/raise function. When the focus servo loop is opened, this driver is used to lift the lens to a "lens up" position. When the loop is closed, the lens is lowered at a rate determined by an RC discharge circuit. Capacitor C2 and resistor R4, which are part of low pass filter 92, are used in the RC discharge circuit. Capacitor C2 is part of the low pass filter whether the loop is open or closed and provides a signal storage function. Since capacitor C2 is so arranged, there is no discontinuity in DC offsets in going from open loop to closed loop operation.

When the loop is opened the lens is lifted at a rate determined by another RC circuit. For safety reasons, the lens is raised at a faster rate than it is lowered. In the raise mode the rate of lifting is determined by capacitor C2 and resistors R5 and R6.

The operation of the focus servo system will now be explained with reference to the focus control logic circuit 24 of FIG. 4. In operation, record medium 1 is loaded onto a turntable and moved into an operating position. At the start of operation, switch S1 is in the "raise" position and switches S2 and S3 are open to disable the servo loop. With switch S1 in the "raise" position, objective lens 2 is lifted above the focus position. To lower the lens to acquire focus, switch S4 is momentarily closed and then opened, thus enabling AND gate 202. The output of AND gate 202 causes electronic switch 204 via flip-flop 205 to enable switch S1, thus changing S1 from a "raise" to a "lower" position. Simultaneously, the level of the Q output of 205 changes state enabling flip-flops 206 and 208. As discussed above, positioning switch S1 in a "lower" position effects a discharge of capacitor C2 lowering the lens in accordance with the RC discharge rate. The output of synchronous detector 22 is applied to the positive and negative inputs of comparators 212 and 210, respectively. Comparator 212 is set to provide an output when the detector output reaches point C of characteristic curve 50 of FIG. 2. Point C is unique in that is occurs near the most positive going peak. The output from comparator 212 triggers flip-flop 208 which in turn provides an enabling signal from its Q output to the D input of flip-flop 206. Flip-flop 206 is now ready for an input from comparator 210.

When the output from detector 22 crosses zero between points A and B on the characteristics curve, switches S2 and S3 are closed to close the servo loop. Comparator 210 will trigger flip-flop 206 when lens 2 is in an "in-focus" position, i.e., when the detector output is zero volts between points A and B on characteristic curve 50. The Q output from flip-flop 206 triggers flip-flop 214 which in turn enables electronic switch 204 to close switches S2 and S3.

Under closed loop operations, the servo loop is automatically opened if the low frequency driver 30 displaces the lens by more than four times the expected disc runout (illustratively, ±2 mils). The output from driver 30 is coupled to the positive and negative inputs of comparators 216, 218, respectively. Comparator 216 is set to open the loop if the lens is displaced too high while comparator 218 opens the loop if the lens goes too low. If the lens goes too high or low, OR gate 220 provides a pulse to reset flip-flops 214 and 205, thus opening switches S2 and S3 and switching switch S1 to its "raise" position, respectively. Objective lens 2 is, therefore, raised to its upper limit and the loop is open.

OR gate 220 is also provided with a manual reset switch S5. If it is desired to manually reset flip-flops 205 and 214, switch S5 may be momentarily closed and opened.

To prevent comparator 216 from producing an output during focus acquisition, i.e., after switch S1 is moved to the "lower" position and the lens is being lowered to a nominal focus position, the negative input of comparator 216 is made more positive than the output of driver 30 while objective 2 is being lowered. The Q output of flip-flop 214 which is high until it is clocked by flip-flop 206 is connected to the negative input of comparator 216. With the Q output from flip-flop 214 in a high state, comparator 216 will not produce an output. When the loop closes and flip-flop 214 receives an input clock pulse from flip-flop 206, the Q output from flip-flop 214 goes low, thus enabling comparator 216 to produce an output if lens 2 exceeds the limits described above.

The response characteristic of transducer 14 will now be explained with reference to FIG. 5. Transducer 14 including coil 18 and magnet 20 has a transfer characteristic as shown by curve 100, i.e., it exhibits a substantially flat characteristic until its resonant frequency (e.g., 40 Hz) is reached, at resonance the response rises slightly and then falls off with a slope of 12 dB/octave. Damping resistor RD effects a critical damping, thus modifying the characteristic curve by reducing the response at resonance (Curve 102). The frequency compensated servo amplifier 26 raises the gain at 6 dB/octave as shown by curve 104. The filter R1, C1 provides a lead network to partially correct for the 12 dB/octave roll-off as shown by curve 106 (illustratively providing a roll-off of 6 dB/octave).

Referring to FIG. 6, an enlarged view of the mechanical stop 34 of FIG. 1 is shown. Frame 110 has a cutout 112 having an upper stop 114 and a lower stop 116. Sleeve 118 which houses objective lens 2 includes a projection 120. The travel of lens 2 is limited in its upward movement by the top of projection 120 contacting upper stop 114 and in its downward movement by the bottom of projection 120 contacting lower stop 116.

What is claimed is:

1. In a focus control system for maintaining the distance between a surface of a record medium and an objective lens substantially constant when relative motion is established between the surface and the objective lens, an apparatus comprising:
- means for generating an error signal that varies in accordance with variations from a given value in the distance between said objective lens and said surface;
- means for moving said objective lens along an axis of said objective lens which is normal to said surface of said record medium;
- means for providing a DC control signal to said moving means, said DC control signal effecting a static positioning of said objective lens;
- first means for providing a first dynamic control signal of a first bandwidth to said moving means, said first dynamic control signal effecting a displacement of said objective lens such that said given value in said distance between said objective lens and said surface is maintained substantially constant; and
- second means for providing a second dynamic control signal of a second bandwidth to said moving means, said first bandwidth of said first dynamic control signal providing means being greater than said second bandwidth of said second dynamic control signal providing means, said second dynamic control signal effecting a displacement of said objective lens such that displacements of said objective lens which maintain said give value in said distance between said objective lens and said surface as effected by said first dynamic control signal average to approximately zero.

2. The apparatus according to claim 1 further comprising:
- a first mechanical stop for limiting the displacement of said objective lens in a first direction along said axis of said objective lens; and
- a second mechanical stop for limiting the displacement of said objective lens in a direction opposite to said first direction such that said objective lens is spaced from said surface of said record medium during said relative motion.

3. The apparatus according to claim 2 further comprising:
- means for amplifying said error signal, said amplifying means having a variable gain over a given frequency band, such that low frequency signals within said given frequency band are amplified more than high frequency signals within said given frequency band.

4. The apparatus according to claim 3 further comprising:
- a first resistive element, connected to said first means for providing a first dynamic control signal, for limiting said current provided by said first means for providing a first dynamic control signal such that said objective lens is limited to travel a given distance; and
- a first reactive element, connected in parallel relationship with said first resistive element, for effecting a phase shift to partially compensate for the frequency roll-off of said moving means.

5. The apparatus according to claim 4 wherein said first reactive element comprises a capacitor.

6. The apparatus according to claim 5 further comprising:
- a second resistive element, connected to said second means for providing a second dynamic control signal, for limiting the current provided by said second means for providing a second dynamic control signal such that said objective lens is displaced in said first direction to contact said first mechanical stop, and is displaced in said direction opposite to said first direction to contact said second mechanical stop.

7. The apparatus according to claim 6 wherein said second means for providing a second dynamic control signal includes a low pass filter for limiting the high frequency response thereof.

8. The apparatus according to claim 7 further comprising:
- a third resistive element and a second reactive element, connected in said low pass filter, for providing a discharge circuit for controlling the rate of descent of said objective lens when said objective lens is lowered from a disc-load position to a disc-play position.

9. The apparatus according to claim 8 wherein said second reactive element includes a capacitor.

10. In a focus control system for maintaining an objective lens positioned to focus a light beam to a diffraction limited spot on a surface of a record disc when relative motion is established between said surface and said objective lens, an apparatus comprising:
- means for generating an error signal that varies in accordance with variations in distance of the objective lens from the focus position;
- means for moving said objective lens along an axis of said objective lens which is normal to said surface of said disc;
- means for amplifying said error signal, said amplifying means having a variable gain over a given frequency band, such that low frequency signals within said given frequency band are amplified more than high frequency signals within said given frequency band;
- a first resistive element, connected to said moving means, effecting a critical damping of said moving means;
- a dc current source, connected in parallel arrangement with said first resistive element, energizing said moving means to lift said objective lens to a nominal focus position;
- a first wide bandwidth current source, connected in parallel arrangement with said first resistive element, providing a drive signal to said moving means to effect displacement of said objective lens to maintain said objective lens in said focus position during said relative motion;
- a second resistive element, connected between said first wide bandwidth current source and said moving means for limiting the current provided by said first wide bandwidth current source;
- a first reactive element, said first reactive element in combination with said second resistive element providing a lead network for partially compensating for the frequency roll-off of said moving means;
- a second narrow bandwidth current source, connected in parallel arrangement with said first resistive element, effecting displacement of said objective lens such that displacements of said objective lens effected by said first current source which maintain said objective lens in said focus position average to approximately zero.

11. The apparatus according to claim 10 wherein said first reactive element includes a capacitor.

12. The apparatus according to claim 11 further comprising:
a third resistive element and a second reactive element connected in said second narrow bandwidth current source to provide a discharge circuit for controlling the rate of descent of said objective lens when said objective lens is lowered from a disc-load position to a disc-play position.

13. The apparatus according to claim 12 wherein said second reactive element comprises a capacitor.

14. The apparatus according to claim 13 further comprising a resistive element coupled in said dc current source such that said dc current source is current limited passively.

15. A focus control system for maintaining an objective lens positioned to focus a light beam to a diffraction limited spot on a surface of a record medium when relative motion is established between said surface and said objective lens, comprising:
means for generating an error signal that varies in accordance with variations in distance of the objective lens from the focus position;
means for moving said objective lens;
means for amplifying said error signal;
a first current source, coupled to said moving means in a servo loop, for providing a drive current to said moving means, said first current source providing a drive current for moving said moving means substantially in response to high frequency error signals, said first current source being current limited passively;
a second current source, coupled to said moving means in said servo loop, for providing a drive current to said moving means, said second current source providing a drive current for moving said moving means substantially in response to dc error signals; said second current source being current limited passively;
a dc current source, coupled to said moving means in an open loop fashion, for providing a drive current to said moving means, said dc current source providing a drive current for moving said moving means to position said objective lens in a nominal focus position, said dc current source being current limited passively.

* * * * *